(12) United States Patent
Schoos et al.

(10) Patent No.: US 6,348,663 B1
(45) Date of Patent: Feb. 19, 2002

(54) METHOD AND DEVICE FOR DETERMINING SEVERAL PARAMETERS OF A SEATED PERSON

(75) Inventors: Aloyse Schoos, Bertrange (LU); Bodgan Serban, Niederkorn (RO); Michel Witte, Luxembourg (LU)

(73) Assignee: I.E.E. International Electronics & Engineering S.a.r.l., Luxembourg (LU)

( * ) Notice: Subject to any disclaimer, the term of this patent is extended or adjusted under 35 U.S.C. 154(b) by 0 days.

(21) Appl. No.: 09/269,826

(22) PCT Filed: Sep. 19, 1997

(86) PCT No.: PCT/EP97/05146

§ 371 Date: Jul. 23, 1999

§ 102(e) Date: Jul. 23, 1999

(87) PCT Pub. No.: WO98/14345

PCT Pub. Date: Apr. 9, 1998

(30) Foreign Application Priority Data

Oct. 3, 1996 (LU) .................................................. 88823
Mar. 21, 1997 (LU) .................................................. 90042

(51) Int. Cl.$^7$ .......................... G01G 19/52; G01G 3/14; B60R 22/00; B60R 21/32

(52) U.S. Cl. ..................... 177/144; 177/210 R; 33/1 V; 280/735; 180/273; 340/667; 701/45

(58) Field of Search ........................ 177/25.11, 25.12, 177/25.13, 136, 144, 210 R, 1; 280/735; 180/273; 200/85 A; 340/667; 33/1 V; 701/45

(56) References Cited

U.S. PATENT DOCUMENTS

| | | | |
|---|---|---|---|
| 1,808,699 A | 6/1931 | Watkins | 49/423 |
| 1,927,651 A | 9/1933 | Reid | 49/441 |
| 1,934,816 A | 11/1933 | Randall | 49/416 |
| 1,978,325 A | 10/1934 | Reid | 49/441 |
| 2,892,657 A | 9/1959 | Brand et al. | 49/440 |
| 3,465,476 A | 9/1969 | Rayner | 49/28 |
| 3,710,050 A | 1/1973 | Richards | 200/61.43 |
| 3,793,772 A | 2/1974 | Kouth | 49/28 |
| 4,115,952 A | 9/1978 | French | 49/26 |
| 4,273,974 A | 6/1981 | Miller | 200/61.43 |
| 4,315,238 A | 2/1982 | Eventoff | 338/99 |
| 4,489,302 A | 12/1984 | Eventoff | 338/99 |
| 4,532,388 A | 7/1985 | Sackmann et al. | 200/61.43 |
| 4,773,155 A | 9/1988 | Buchien | 29/622 |
| 4,810,992 A | 3/1989 | Eventoff | 338/99 |
| 4,920,241 A | 4/1990 | Miller | 200/86 R |

(List continued on next page.)

FOREIGN PATENT DOCUMENTS

| | | |
|---|---|---|
| DE | 3347945 C2 | 5/1987 |
| DE | 4201019 A1 | 7/1993 |
| DE | 4427537 A1 | 2/1996 |
| DE | 19502033 C1 | 6/1996 |
| EP | 0504481 A1 | 12/1991 |
| EP | 0538656 A2 | 9/1992 |
| EP | 0728636 A1 | 2/1996 |
| GB | 230234 | 2/1924 |
| GB | 942892 | 9/1960 |
| GB | 2300444 | 5/1996 |

*Primary Examiner*—Randy W. Gibson
(74) *Attorney, Agent, or Firm*—Charles N. Quinn, Esq.

(57) ABSTRACT

The invention concerns a method for determining several parameters of a seated person, comprising the following steps: subdividing the seat surface (4) into at least two sections, determining the barycenter position of the active weight in each section, and evaluating said parameters of said person based on said determined positions. The evaluation of said parameters can include the evaluation of the size and/or weight of said person, the evaluation of the position of the said person on said seat based on the distribution of the barycenter positions on the seat or the evaluation of the orientation of said person on said seat based on the longitudinal positions of the barycenters of the active weight in each section.

49 Claims, 5 Drawing Sheets

U.S. PATENT DOCUMENTS

Figure 1:
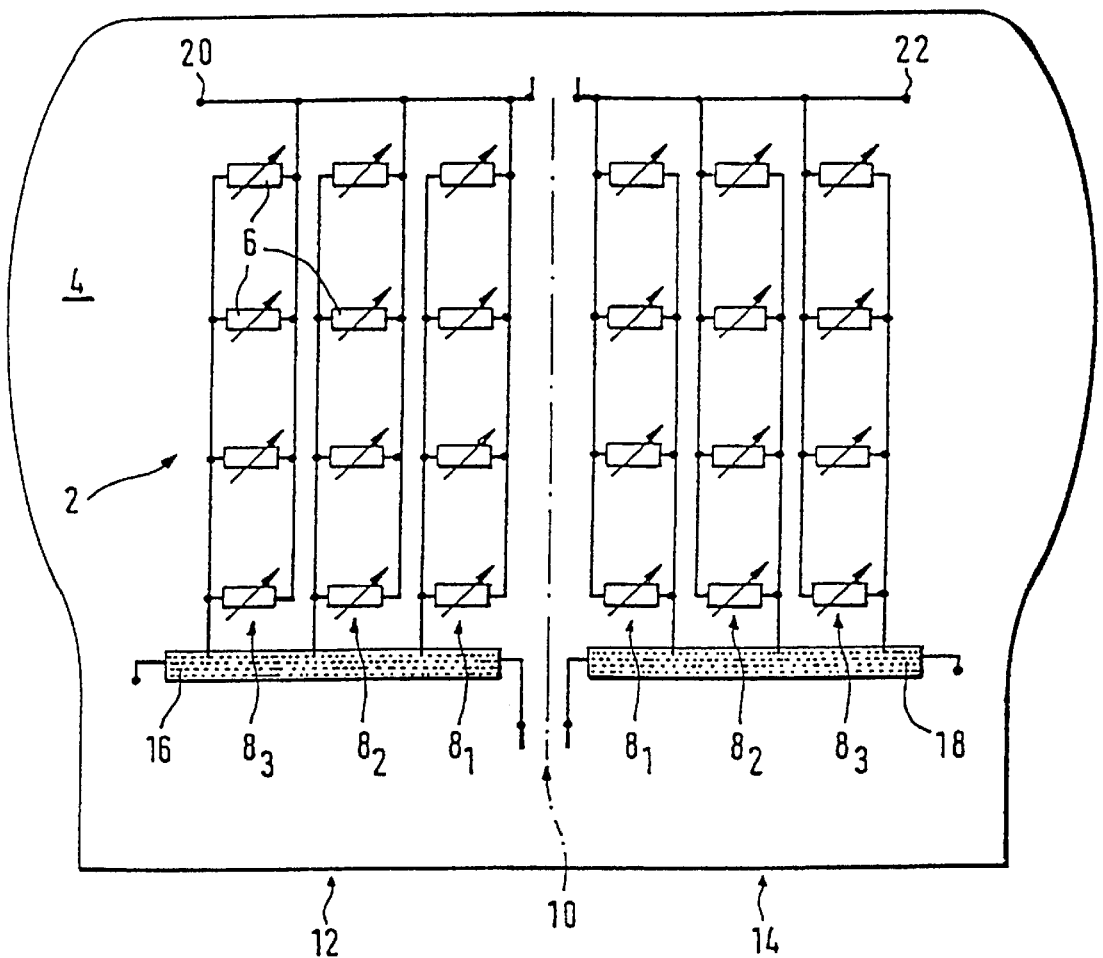
Figure 2A:
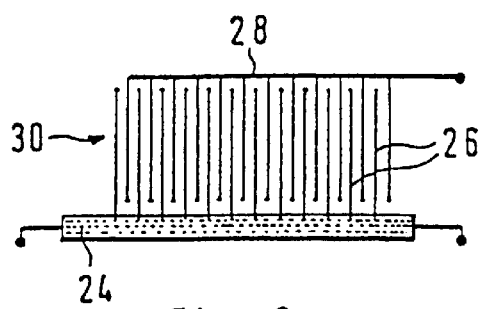
Figure 2B:
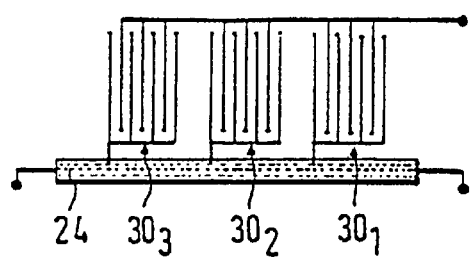
Figure 2C:
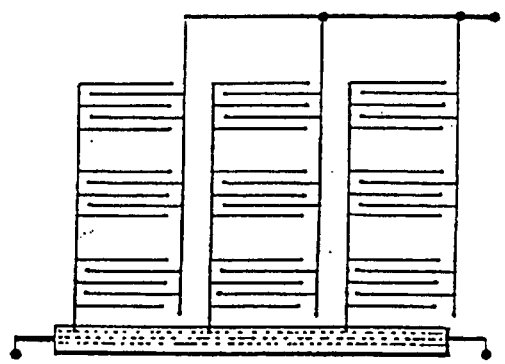
Figure 2D:
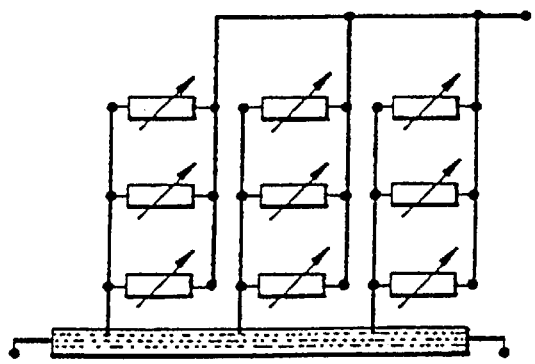
Figure 2E:
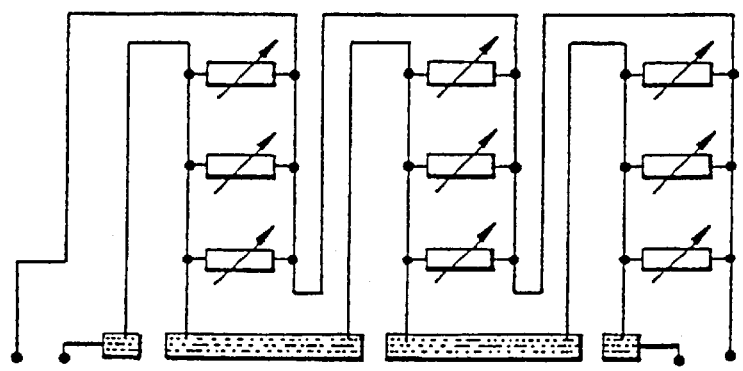

| | | | |
|---|---|---|---|
| 5,016,394 A | | 5/1991 | Iida et al. ...................... 49/441 |
| 5,232,243 A | * | 8/1993 | Blackburn et al. .......... 280/732 |
| 5,233,758 A | | 8/1993 | Bielis et al. ................ 29/897.2 |
| 5,262,603 A | | 11/1993 | Miller .................... 200/61.43 |
| 5,276,432 A | * | 1/1994 | Travis ........................ 340/666 |
| 5,285,136 A | | 2/1994 | Duhame .................... 318/266 |
| 5,296,658 A | | 3/1994 | Kramer et al. ........... 200/61.43 |
| 5,384,982 A | | 1/1995 | Galperin ........................ 49/27 |
| 5,398,185 A | * | 3/1995 | Omura ........................ 701/45 |
| 5,459,962 A | | 10/1995 | Bonne et al. .................. 49/28 |
| 5,474,327 A | | 12/1995 | Schousek ................... 280/735 |
| 5,573,269 A | * | 11/1996 | Gentry et al. ............... 280/735 |
| 5,592,060 A | | 1/1997 | Racine et al. ............... 318/469 |
| 5,602,370 A | | 2/1997 | Kau ........................ 200/61.43 |
| 5,612,876 A | * | 3/1997 | Zeidler et al. ................. 701/45 |
| 5,621,290 A | | 4/1997 | Heller et al. ................. 318/466 |
| 5,750,937 A | * | 5/1998 | Johnson et al. .......... 177/25.11 |
| 5,986,221 A | * | 11/1999 | Stanley ....................... 177/136 |
| 5,987,370 A | * | 11/1999 | Murphy et al. ................ 701/45 |
| 6,040,532 A | * | 3/2000 | Munch ....................... 177/144 |
| 6,056,079 A | * | 5/2000 | Cech et al. ................. 180/273 |
| 6,069,325 A | * | 5/2000 | Aoki ........................... 177/136 |
| 6,070,115 A | * | 5/2000 | Oestreicher et al. .......... 701/45 |
| 6,101,436 A | * | 8/2000 | Fortune et al. ................ 701/45 |
| 6,138,067 A | * | 10/2000 | Cobb et al. ................... 701/45 |

\* cited by examiner

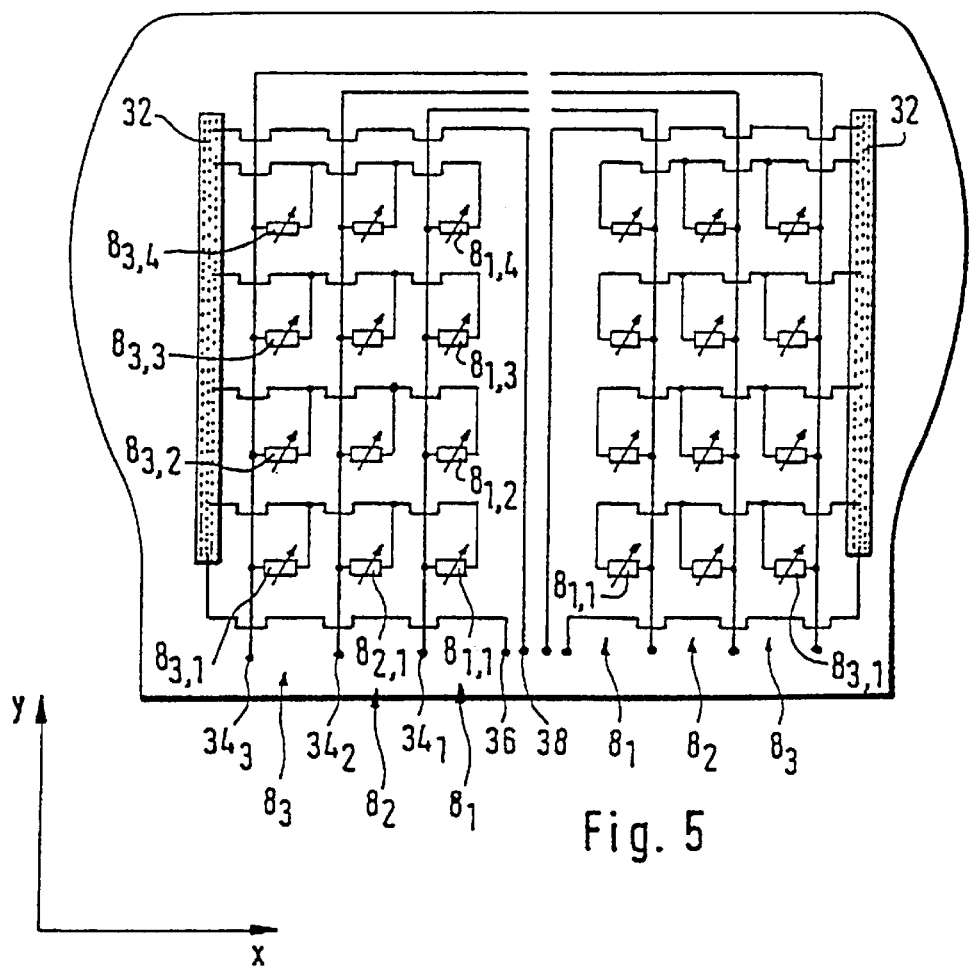
Fig. 5
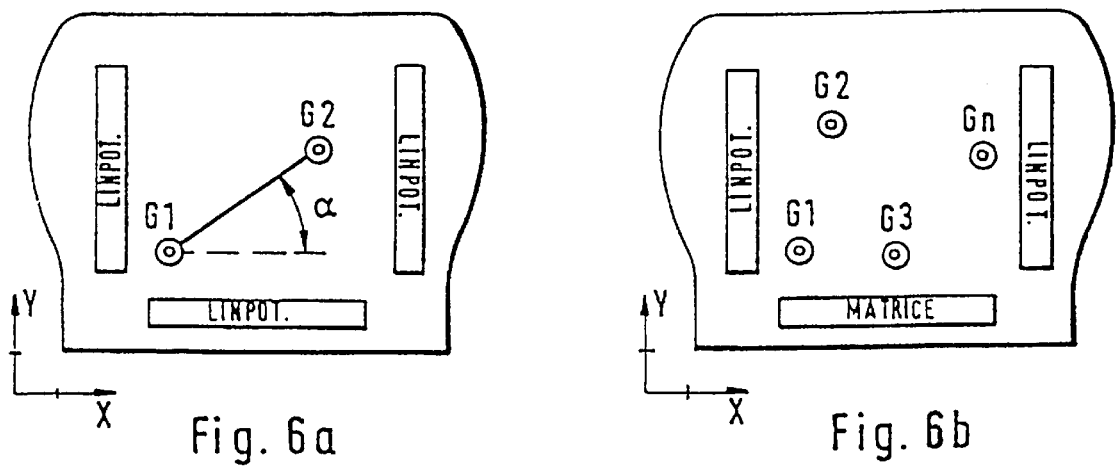
Fig. 6a
Fig. 6b

METHOD AND DEVICE FOR DETERMINING SEVERAL PARAMETERS OF A SEATED PERSON

The present invention relates to a method and device for determining several parameters of a person sitting on a seat, such as, for example, the size and/or the weight of the passenger and/or the orientation of the passenger on the seat. Such a device is particularly applicable in the area covering the control of the protection system in motor vehicles.

In order to protect the lives of passengers during a traffic accident, modern vehicles are generally fitted with a protection system comprising several airbags and seat belt pre-tensioners, which are used to absorb the energy of a passenger released during the collision due to the accident. It is clear that such systems are even more effective when they are better adapted to the specific requirements of each passenger, i.e. to the weight and/or the size of the passenger. That is why microprocessor-controlled protection systems have been designed which provide several operational modes, for example allowing an adaptation of the instant at which airbags are deployed and their volume, of the instant at which safety belts are released after the collision, etc, as a function of the stature of the passenger and the orientation of the passenger on the seat.

In order to enable the control microprocessor to select the optimum operational mode for a given passenger, it is therefore necessary to have available a device for detecting the stature of the passenger which determines the size and/or the weight and/or the orientation of the passenger and which indicates this to the control circuit of the protection system. For this purpose, the U.S. Pat. No. 5,232,243 describes a device for detecting the weight of a passenger which comprises several individual force sensors arranged in a matrix array in the vehicle seat cushion. The force sensors have an electric resistance that varies with the applied force and are known by the abbreviation FSR (force sensing resistor). The resistance of each sensor is measured individually and, by adding the forces corresponding to the values of these resistances, an indication is obtained of the total force exerted, i.e. of the weight of the passenger.

However, the total weight of a passenger does not act solely on the surface of the seat, since part of the weight is supported by the passenger's legs, which rest on the bottom of the vehicle, and another part rests on the back of the seat. In addition, the ratios between the various parts vary considerably with the passenger's position on the seat, which causes the total force measured by the individual force sensors not to correspond to the real weight of the passenger but to experience very large variations depending on the passenger's posture on the seat.

Moreover, because of variations with temperature of the characteristics of the seat padding, the individual forces measured by the different force sensors depend greatly on the ambient temperature in the vehicle. In fact, at very low temperatures, foam padding for example becomes very hard, causing the forces measured by the sensors to be less than the real forces. At very high temperatures, on the other hand, foam padding expands and exerts an additional pressure on the sensors, so that the forces measured by the sensors are greater than the forces actually exerted. It follows from this that the device for detecting the weight of a passenger, as described in the above-mentioned document, cannot really satisfy the requirements of a modern protection system whose operation must to a large extent be independent of the ambient conditions.

The objective of the present invention is therefore to propose a device for determining several parameters of a person sitting on a seat, the operation of which is to a large extent independent of the temperature and of the passenger's posture on the said seat.

In conformity with the invention, this objective is achieved by a device making it possible to determine the size and/or the weight of a person sitting on a seat, which operates according to a principle different from that of existing weight detectors. The method used for determining the size and/or the weight of a person sitting on a seat involves the subdivision of the seat's surface into at least two sections, the determination of the position of the centre of gravity of the active weight in each section, and the evaluation of the size and/or the weight of the said person from the said positions so determined. Measurements are therefore no longer made of the magnitude of the force exerted by the passenger on the seat, but measurements are instead made of the positions at which this force acts. In other words, relative values are now to be measured instead of absolute values. The positions at which the force acts determined in this way are therefore to a large extent independent of the factors affecting the absolute values of the force, such as the posture of the passenger on the seat and the ambient temperature. The respective positions of the centres of gravity in the different sections of the seat then make it possible to determine the size and/or the weight of the person and, for example, the person's position and/or orientation on the seat.

By subdividing the seat, for example into a plurality of adjacent sections, and by determining the positions at which the weight acts in each of these sections, it is possible to determine the total area over which the weight is active, i.e. the area of the seat occupied by the passenger. Moreover, it is easy to determine the position of the passenger on the seat from the distribution of the different positions of the centres of gravity, and this makes it possible to assess whether the passenger is sitting in the middle of the seat. By comparing the longitudinal positions of the centres of gravity in different laterally adjacent sections of the seat, it is possible to determine the orientation of the passenger on the seat, i.e. whether the passenger is facing the front or a different direction. It should be noted that the different parameters are preferably assessed sequentially using the same detector.

In a preferred version of the method, the surface of the seat is subdivided into two laterally adjacent sections and the evaluation of the size and/or the weight involves determining the distance between the positions of the two centres of gravity of the weight in the said two sections. The parameter so determined is therefore the lateral distance between the position at which the weight acts on the left-hand part of the seat and the position at which the weight acts on the right-hand part of the seat, i.e. a distance which is correlated with the stature of the passenger. From this distance, it is thus possible to evaluate the weight and/or the size of the passenger by using a model of a human body based on statistical measurements.

It is true that a method of determination using a model of a human body cannot provide an exact measurement of the real weight of the seat's occupant. However, in view of the restricted number (3 for example) of ways in which the airbags or seat belt pre-tensioners in a vehicle can function, the requirements for the control device of the protection system as regards the accuracy of the real value of the weight are only of secondary importance. It is in fact necessary only to allocate the different passengers to a restricted number of categories as regards weight and size for the control device to be able to select the appropriate operational mode to be applied. In the example of three operational modes for the protection system, three categories of weights have to cover a total range from, for example, 0 to 100 kg, i.e. each category must cover a range of about 30 kg. Now it is clear that, for a classification into such broad categories, the results obtained by evaluating weight and/or size using a human model to a great extent satisfy the requirements of accuracy in the system.

In order to work according to the method described above, a device for determining the size and/or the weight of a person sitting on a seat therefore comprises a means for determining the respective positions of the centres of gravity of the active weight in at least two different sections of the said seat and a means of evaluating the size and/or the weight of the said person from the said determined positions. The positions of the centres of gravity determined in this way give, for example, an indication of the total area over which the weight is active, i.e. the area of the seat which is occupied by the passenger. To achieve this, the surface of the seat should be subdivided into a large number of sections. However, in a preferred execution, the said means of determining the positions of the centres of gravity comprise a means of detecting the distance between a first centre of gravity of the weight on a first section of the seat and a second centre of gravity of the weight on a second section of the seat, the two sections of the seat being laterally adjacent. In other words, the lateral distance is measured between the position at which the weight acts, for example on the left-hand part of the seat, and the position at which the weight acts on the right-hand part of the seat, i.e. a distance which is related to the width of the area of the seat occupied by the passenger. This distance then makes it possible to evaluate the weight and/or the size in the way described above.

The means for determining the positions of the centres of gravity preferably comprise a position-defining force detector extending over the surface of the seat. Such a detector consists, for example, of a plurality of switching elements arranged in a plurality of adjacent sections of the seat. These switching elements are then interconnected in an n×m matrix array so that they can be individually identified. However, such a detector requires a large number ($\geq n*m$) of connections with the outside, i.e. with the control device for the protection system, and inside the control device it requires a sophisticated electronic system for the real-time exploitation of the n*m signals from the different switching elements.

In an advantageous implementation, the said position-defining force detector comprises several active areas in the form of strips, the said active areas being positioned on both sides of a line separating the said two sections and extending parallel to it. The strip-shaped active areas then advantageously extend over a major part of the length of the seat's surface, so that a determination of the width of the area occupied by passengers is independent of their longitudinal position on the seat. This implementation on the one hand considerably reduces the number of connections of the detector with the outside and on the other hand enables a less sophisticated electronic system to be used for the real-time exploitation of the signals from the active areas.

Advantageously, the said force detector comprises force sensors whose electric resistance varies with the applied force. These force sensors are known by the abbreviation FSR (force sensing resistors) and enable the value of the force applied to the active area to be detected directly. This direct measurement of the applied force thus enables the device according to the invention also to operate as a detector of the occupation of the seat. In other words, below a certain value of the force measured by the FSRs corresponding to a certain minimum weight acting on the seat, the protection system for the seat in question is not activated at all. During a collision due to an accident, a determination of the passenger's weight category is made and the protection system is activated only if the limiting value of the force is exceeded.

For safety reasons, the device advantageously comprises a circuit for monitoring the integrity of the conductors. This circuit monitors the integrity of the conductors, for example when the vehicle starts up, and indicates to the control device of the protection system any breakdown in a connection or a conductor. In the case of such a breakdown which risks affecting the correct operation of the detection device, the control device will select a standard operational mode of the protection system which represents a compromise solution for all the weight categories.

Figure 3:
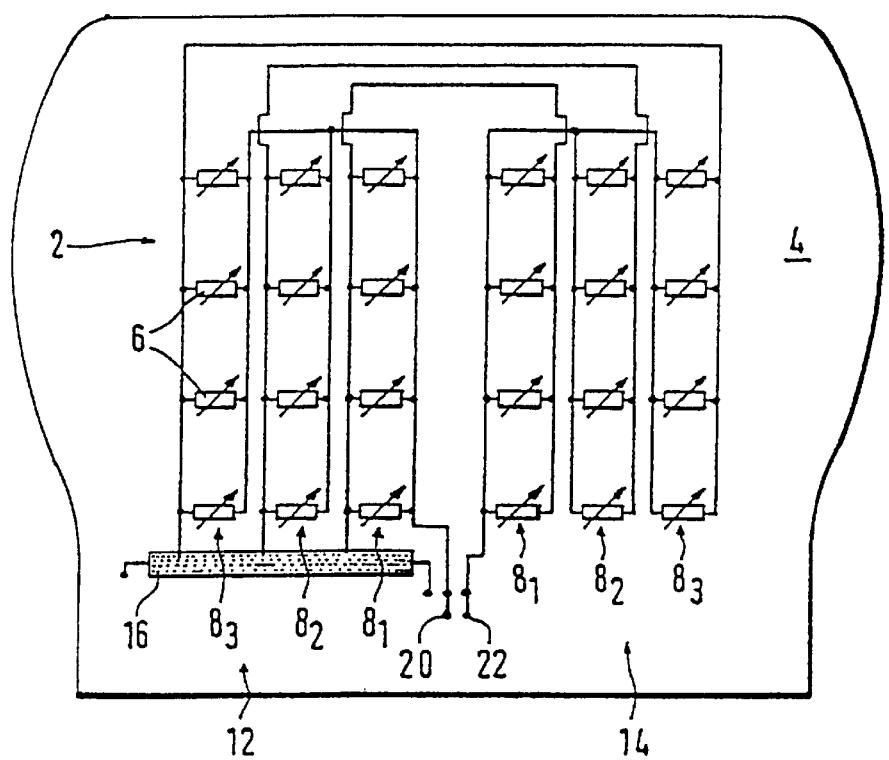
Figure 4:
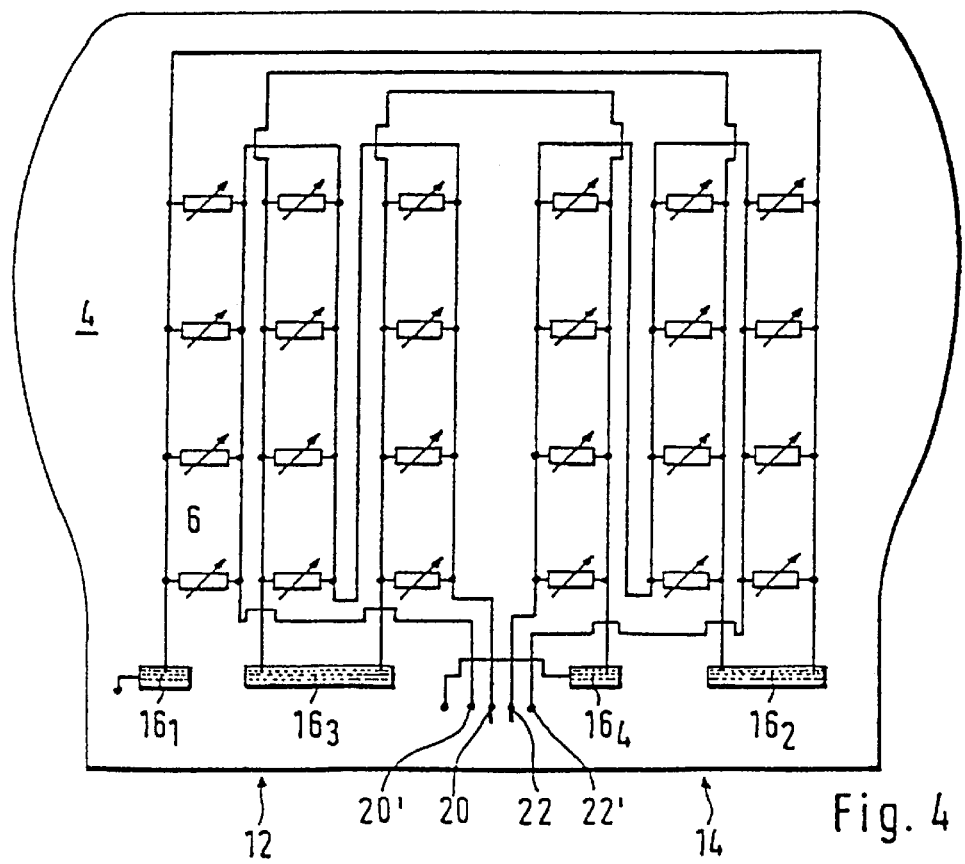
Figure 7:
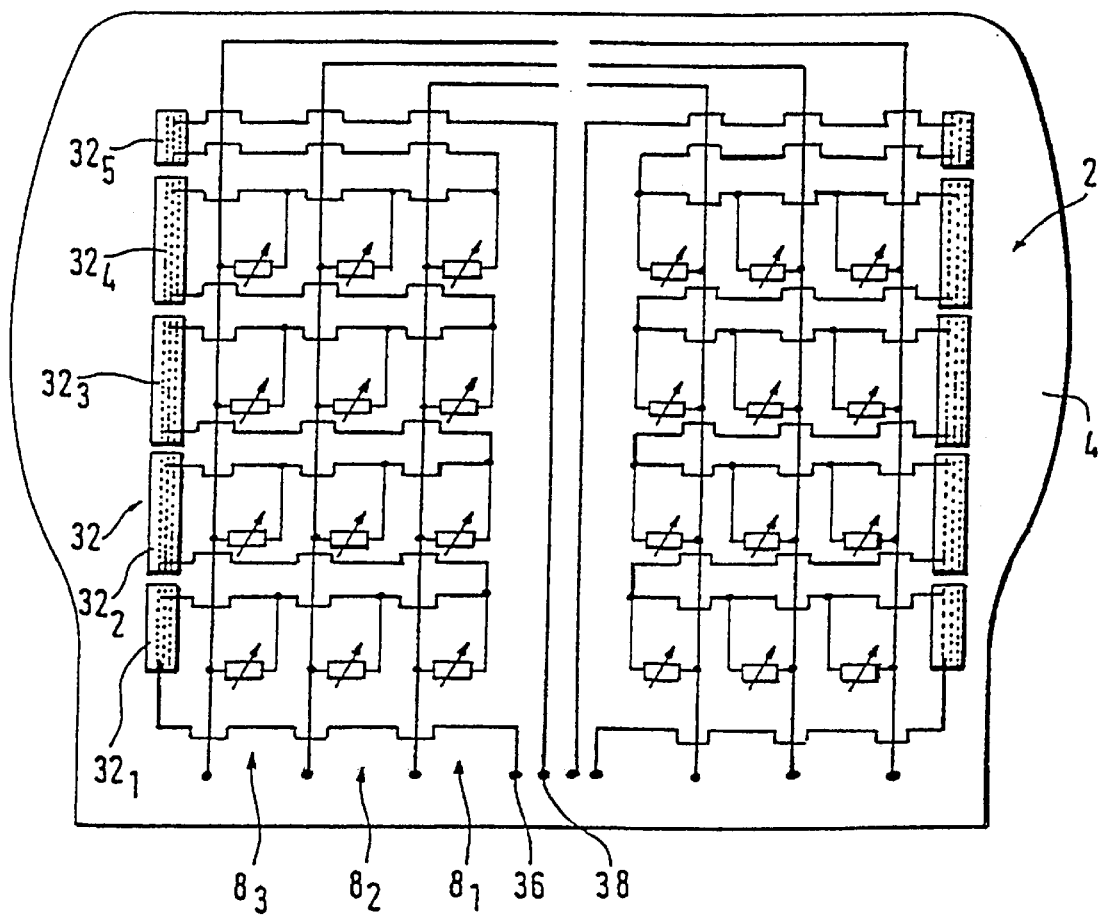

Other special features and characteristics of the invention will emerge from the detailed description of several advantageous embodiments described below, as illustrative examples, with reference to the appended drawings. These show:

FIG. 1: a first embodiment of a device for detecting weight and/or size according to the invention;

FIGS. 2a–2e: a diagram illustrating the operation of a position-defining detector;

FIG. 3: a second embodiment of a device for detecting weight and/or size according to the invention;

FIG. 4: a third embodiment of a device for detecting weight and/or size according to the invention, enabling the integrity of the conductors to be monitored;

FIG. 5: another embodiment of a device for detecting weight and/or size according to the invention, capable also of detecting the longitudinal position and/or the orientation of the passenger on the seat;

FIGS. 6a & 6b: a diagram summarising the measurements possible with a detector according to FIG. 5 for different modes of connection of the active areas;

FIG. 7: an embodiment of the detector of FIG. 5 enabling the integrity of the conductors to be monitored.

FIG. 1 shows a preferred embodiment of a device for detecting weight and/or size 2 which is incorporated in the padding of a seat 4 in a vehicle. This is an embodiment with a position-defining force detector 2 produced using variable-resistance force detectors 6 of the FSR type which are arranged on a flexible support (not shown). These FSR sensors 6 are represented in the figure by variable resistors.

An FSR sensor is described for example in the U.S. Pat. No. 4,489,302 and consists of two layers, the first of which is formed from a semiconductor element and the second of which has two combs of interdigital conductors. At zero force, the two layers of the FSR sensor are separated and the resistance between the two conductors is very high. Under the action of a force, the two conductors are shunted by the semiconducting layer and the resistance between the two conductors decreases as the applied force increases. In another type of FSR sensor, two conductors of any shape are separated by an intercalated semiconducting layer. Under the action of a force, the two conductors and the semiconducting layer are pressed together and the resistance between the two conductors decreases as the applied force increases. Such an FSR sensor is described for example in the U.S. Pat. No. 4,315,238.

In the embodiment of FIG. 1, several FSR sensors 6 are connected at each instant to form several active areas 8 in the shape of strips extending over a large proportion of the length of the seat's surface. Given the great variations possible in the dimensions with which the FSR sensors 6 may be manufactured, such a strip-shaped active area 8 may also be formed by a single strip-shaped FSR sensor 6.

The active areas 8 are arranged on both sides of a line of separation 10 on the surface of the seat and are located symmetrically on the surface. This line of separation 10 subdivides the surface of the seat into two laterally adjacent sections 12, 14 and is preferably a line of symmetry on the seat 4. So that the position of the centre of gravity of the weight in each of the sections can be measured, the number of active areas 8 of the force detector 2 in each of the sections 12, 14 of the seat 4 is greater than or equal to two.

The device in the example shown in FIG. 1 comprises three active areas on each section 12, 14 of the seat 4, which are laterally spaced out in a more or less regular manner. The different active areas 8 of a section 12, 14 of the seat 4 are supplied with different voltages, i.e. a first conductor of each FSR sensor of an active area is connected to the respective supply voltage. The supply voltage of the active areas 8 increases as they pass from the inside of the seat 4 to the outside. In other words, the active area $8_1$ located on the inside of the seat near the line of symmetry 10 is connected to a first supply voltage $T_1$, the active area $8_2$ located in the middle of each section 12 or 14 is connected to a second supply voltage $T_2$ and the active area $8_3$ located on the outside near the edge of the seat 4 is connected to a third supply voltage $T_3$, with $T_1<T_2<T_3$. In order to reduce the number of external connections, the different voltages $T_1$, $T_2$, $T_3$ required to supply the three active areas $8_1$, $8_2$, $8_3$ in each section 12, 14 are preferably supplied through a linear resistor 16, 18 or through a chain of resistors connected in series, to the terminals of which is applied a potential difference to create a potential gradient. The different active areas $8_1$, $8_2$, $8_3$ are then connected to different voltages depending on the position of their connection to the linear resistor 16, 18.

Through their second conductors, the FSR sensors 6 are connected to an output line 20 or 22 of the detector 2. The circuit produced in this way corresponds to a linear potentiometer whose slider operates as a potential divider between the terminals of the linear resistor 16, 18. With the resistances of the different active areas $8_1$, $8_2$, $8_3$ decreasing as the force with which the active areas are activated increases, the voltage at the output 20 or 22 takes on a value corresponding to a weighted mean of the three supply voltages $T_1$, $T_2$, $T_3$, the weighting being produced by the relative resistances of the active areas. In other words, the greater the pressure on an active area, the more the respective supply voltage contributes to the output voltage. It should be noted that such a weighting also takes into account the distribution of the weight over the length, i.e. it takes into consideration the length over which the different active areas are stressed. In fact, the resistance of an active area decreases as the number of its FSR sensors that are stressed increases and hence the active area in principle carries out an integration of the force over the area acted on by the force. Thus, the voltage measured at the output 20 or 22 gives a direct indication of the position of the centre of gravity of the weight in the respective section. It is clear that, because the supply voltages increase from the inside to the outside of the seat, $T_1<T_2<T_3$, the voltage at the output 20 or 22 will be greater as the centre of gravity moves further to the outside. In other words, the greater the area occupied by the passenger on the seat, the higher the voltages at the output lines 20 and 22.

By measuring the voltages at the two output lines 20 and 22, the positions of the centres of gravity of the weight in the two sections of the seat 4 are known and in this way the distance between these two centres of gravity can easily be calculated. It should be noted that it is also possible to connect the two output lines 20 and 22 in order to add the two output voltages from the two sections of the seat. This gives an output signal which is directly proportional to the distance between the two centres of gravity of the weight. This embodiment enables the number of external connections to be reduced. However, information about the distribution of the area occupied over the two sections 12 and 14 is lost.

FIG. 2 is a schematic illustration of the connection of the three active areas as a linear potentiometer. The starting point is a simple linear potentiometer produced using an FSR force sensor (FIG. 2a). Such a linear potentiometer circuit is described, for example, in the U.S. Pat. No. 4,810,992. It consists of a linear resistor 24 at the terminals of which different voltages are applied so as to create a potential gradient. Connectors 26 extending laterally at regular intervals are connected to the said linear resistor 24. The slider 28 of the potentiometer is formed by a second conductor in the form of a comb whose teeth extend between the connectors 26. By short-circuiting the two connectors 26 and 28 at a certain point, the conductor 28 is subjected to a voltage which varies linearly with the position of the conductor 26 on the linear resistor 24. In order to create several separate active areas, the active area 30 of the potentiometer is then divided into several zones $30_1$, $30_2$, $30_3$ (FIG. 2b). These active zones $30_1$, $30_2$, $30_3$ are lengthened in order to form strip-shaped active areas extending over almost the whole of the length of the seat (FIG. 2c) and are symbolised by variable resistances connected in series (FIG. 2d). If the possibility of monitoring the integrity of the conductors needs to be available, the said conductors are modified in such a way that they form loops having external connections (FIG. 2e).

FIG. 3 represents a simplified embodiment of the detector in FIG. 1, which makes possible a further reduction in the number of external connections required. The detector 2 consists of no more than a single linear resistor 16, to the terminals of which are applied a potential difference in order to supply the different active areas $8_1$, $8_2$, $8_3$ of the two sections 12 and 14 of the seat 4. Each of the active areas $8_1$, $8_2$, $8_3$ of the section 14 of the seat 4 is for this purpose connected to the respective active area $8_1$, $8_2$, $8_3$ of the section 12, so that the two areas $8_1$ are supplied by the same voltage $T_1$, the two areas $8_2$ are supplied by the same voltage $T_2$, and the two areas $8_3$ are supplied by the same voltage $T_3$.

In this embodiment, the number of external connections is reduced to four, namely the two terminals of the linear resistor 16 and the two output lines 20 and 22. It is even possible to reduce the number of connections necessary to three by connecting the two outputs 20 and 22. However, as mentioned above, this causes the loss of information about the weight distribution over the two sections 12 and 14.

Another embodiment of a device for determining the size and/or the weight according to the invention is represented in FIG. 4. This is an embodiment making it possible to monitor the integrity of the different conductors. For this purpose, all the conductors connecting the different FSR sensors 6 with each other or with the linear resistor 16 are arranged so as to form loops with external connections. In order to limit the number of such external connections, the linear resistor 16 is, for example, subdivided into several discrete resistors $16_1$, $16_2$, $16_3$, $16_4$ placed on both sides of the line of separation of the two sections so as to enable all the active areas $8_1$, $8_2$, $8_3$ of the two sections 12 and 14 to be supplied by a single loop. There is a total of six external connections, given that each of the output lines 20, 22 is formed by one loop and has two connections 20, 20' and 22, 22'.

The integrity of the conductors can be monitored by injecting a signal into a first connection of each loop and by detecting the signal at the second connection. This is preferably achieved through the control device of the vehicle protection system. When, on one of the output connections of the different loops, the control device does not detect the signal injected at the other connection, it chooses a standard operational mode of the protection system representing a compromise solution for all the weight categories.

It should be noted that, for this embodiment, it is also possible to reduce the number of connections still further at the expense of information about the weight distribution by connecting the two output lines 20 and 22 and by allowing only the connections 20' and 22' to leave the system.

FIG. 5 shows an embodiment of a device 2 for detecting several parameters of a person sitting on a seat 4, with which it is possible to detect in sequence the lateral positions (in the x direction) and the longitudinal positions (in the y direction) of the centres of gravity of the active weight in the different sections of the seat. Depending on the operational mode, this device therefore makes it possible to detect both the weight and/or the size of the person and the longitudinal position and/or the orientation of the person on the seat.

For this purpose, each active area $8_1$, $8_2$, $8_3$ comprises several individual sensors $8_{1,1}$, $8_{1,2}$, $8_{1,3}$, $8_{1,4}$ or $8_{2,1}$, $8_{2,2}$, $8_{2,3}$, $8_{2,4}$ or $8_{3,1}$, $8_{3,2}$, $8_{3,3}$, $8_{3,4}$ which are arranged one behind the other in the longitudinal direction of the seat and which are interconnected at one of their terminals through the intermediary of a linear resistor 32 or a chain of discrete resistors connected in series. At the other terminal, the individual sensors $8_{1,1}$, $8_{1,2}$, $8_{1,3}$, $8_{1,4}$ or $8_{2,1}$, $8_{2,2}$, $8_{2,3}$, $8_{2,4}$ or $8_{3,1}$, $8_{3,2}$, $8_{3,3}$, $8_{3,4}$ of each active area $8_1$, $8_2$, $8_3$ respectively are interconnected through the intermediary of a conductor $34_1$, $34_2$ or $34_3$ respectively.

In a first operational mode, that for the size/weight determination, different voltages $T_1$, $T_2$, $T_3$ are applied in each section 12, 14 of the seat 4 to the conductors $34_1$, $34_2$, $34_3$ of the different active areas $8_1$, $8_2$, $8_3$ of each section 12 or 14 such that $T_1<T_2<T_3$, and the output signal at one of the terminals 36 or 38 of the linear resistor 32 is measured. In order to reduce the effects of the resistor 32 interconnecting the different individual sensors $8_{1,1}$, $8_{1,2}$, $8_{1,3}$, $8_{1,4}$ or $8_{2,1}$, $8_{2,2}$, $8_{2,3}$, $8_{2,4}$ or $8_{3,1}$, $8_{3,2}$, $8_{3,3}$, $8_{3,4}$ on the measured voltages, the terminals 36 and 38 are connected together so that the resistor 32 is connected in a closed loop.

The detector 2 connected in this way then functions similarly to the detector of FIG. 1. The circuit thus produced corresponds to a linear potentiometer whose slider operates as a voltage divider between voltages $T_1$, $T_2$ and $T_3$. With the resistances of the different active areas $8_1$, $8_2$, $8_3$ decreasing as the force with which the active areas are activated increases, the voltage at the output 36 or 38 takes on a value corresponding to a weighted mean of the three supply voltages $T_1$, $T_2$, $T_3$, the weighting being produced by the relative resistances of the active areas.

It should be noted that, for this operational mode, the three supply voltages $T_1$, $T_2$, $T_3$ may either be supplied directly to the conductors $34_1$, $34_2$, $34_3$ by the control device (not represented) of the system, or may be supplied by a linear resistor or by a chain of resistors connected in series, to the terminals of which a potential difference is applied so as to create a potential gradient (see FIG. 1). The different active areas $8_1$, $8_2$, $8_3$ are then connected to different voltages depending on the position of their connection to the linear resistor.

In the second operational mode, that for the detection of position/orientation, the individual sensors $8_{1,1}$, $8_{1,2}$, $8_{1,3}$, $8_{1,4}$ or $8_{2,1}$, $8_{2,2}$, $8_{2,3}$, $8_{2,4}$ or $8_{3,1}$, $8_{3,2}$, $8_{3,3}$, $8_{3,4}$ of each active area are supplied by different voltages, so that the supply voltage increases towards the rear of the seat. The different voltages are preferably supplied by applying a potential difference to the terminals 36 and 38 of the resistor 32. The different individual sensors $8_{1,1}$, $8_{1,2}$, $8_{1,3}$, $8_{1,4}$ or $8_{2,1}$, $8_{2,2}$, $8_{2,3}$, $8_{2,4}$ or $8_{3,1}$, $8_{3,2}$, $8_{3,3}$, $8_{3,4}$ are then connected to different voltages depending on the position of their connection to the linear resistor 32. The positions of the connections of the corresponding individual sensors $8_{1,1}$, $8_{2,1}$, $8_{3,1}$ or $8_{1,2}$, $8_{2,2}$, $8_{3,2}$ or $8_{1,3}$, $8_{2,3}$, $8_{3,3}$ or $8_{1,4}$, $8_{2,4}$, $8_{3,4}$ of the respective different active areas $8_1$, $8_2$, $8_3$ are advantageously the same, so that the corresponding individual sensors $8_{1,1}$, $8_{2,1}$, $8_{3,1}$ or $8_{1,2}$, $8_{2,2}$, $8_{3,2}$ or $8_{1,3}$, $8_{2,3}$, $8_{3,3}$ or $8_{1,4}$, $8_{2,4}$, $8_{3,4}$ are supplied by the same voltage.

In this operational mode, the output voltages from the different active areas $8_1$, $8_2$, or $8_3$ on the conductors $34_1$, $34_2$, $34_3$ are then advantageously measured. The active areas $8_1$, $8_2$, $8_3$ of each section 12 or 14 are therefore connected in a matrix array, i.e. the output voltage on each output line $34_1$, $34_2$, $34_3$ of each of the active areas $8_1$, $8_2$, $8_3$ is measured separately. The circuit produced in this way for each active area $8_1$, $8_2$, or $8_3$ corresponds to a linear potentiometer whose slider operates as a voltage divider between the terminals of the linear resistor 32. Since the resistances of the different individual sensors $8_{1,1}$, $8_{1,2}$, $8_{1,3}$, $8_{1,4}$ or $8_{2,1}$, $8_{2,2}$, $8_{2,3}$, $8_{2,4}$ or $8_{3,1}$, $8_{3,2}$, $8_{3,3}$, $8_{3,4}$ decrease as the force with which the sensors are activated increases, the voltages on the conductors $34_1$, $34_2$, $34_3$ take on values corresponding to a weighted mean of the supply voltages of the different individual sensors $8_{1,1}$, $8_{1,2}$, $8_{1,3}$, $8_{1,4}$ or $8_{2,1}$, $8_{2,2}$, $8_{2,3}$, $8_{2,4}$ or $8_{3,1}$, $8_{3,2}$, $8_{3,3}$, $8_{3,4}$ of the respective active areas, the weighting being produced by the relative resistances of the individual sensors. In other words, the more the pressure on an individual sensor, the more its respective supply voltage contributes to the output voltage on the respective conductor $34_1$, $34_2$, $34_3$.

Since the supply voltages of the individual sensors increase from the front of the seat to the rear, an output voltage is obtained at each conductor $34_1$, $34_2$, $34_3$ which becomes higher as the person sits more to the rear of the seat. These output voltages are therefore representative of the longitudinal positions of the centres of gravity of the active weight in the different strip-shaped active areas $8_1$, $8_2$, $8_3$. From the distribution of these longitudinal positions on the seat, it is then easy to define the longitudinal position of the passenger on the seat and the orientation of the passenger on the seat. In effect, very low voltages measured on the conductors of the two sections indicate that the person is sitting more on the front edge of the seat 4. In addition, a highly asymmetrical distribution of the positions on the two sections of the seat makes it possible to deduce that the orientation is not towards the front and, as a result, that a command should be sent to the vehicle airbag.

By making measurements sequentially according to the two operational modes of the detector, it then becomes possible, with a single detector, to measure both the size and/or the weight of the person sitting on the seat and the position and orientation of the person with respect to the seat. Since the switching between the two operational modes may take place several times per second, it then become possible to detect all changes in position of the passenger on the seat almost in real time and hence to adapt the deployment of the airbag.

An alternative position/orientation detection mode consists in connecting the three conductors $34_1$, $34_2$, $34_3$ together and measuring only the resultant voltage. This alternative applies mainly when the three active areas are supplied, in the size/weight detection mode, through the intermediary of a linear resistor as described above and similar to the embodiment in FIG. 1. In this case, the terminals of the linear resistor interconnecting the active areas are connected together and the voltage applied to each closed loop is measured. Depending on the method of connecting the active areas, it is still possible to distinguish two different measurements of position, which are represented diagrammatically in FIG. 6.

In the case of a supply to the active areas by means of a linear resistor (FIG. 6a), a measurement is therefore made not of the relative positions of the centres of gravity of the active weight on each active area $8_1$, $8_2$, $8_3$ but only of the positions of the centres of gravity of the active weight on each section 12, 14. However, this procedure does make it possible to measure the real distance between the two centres of gravity of the active weight in the two sections by taking into account their longitudinal positions. By comparison, with the devices according to FIG. 1, only $(x_1-x_2)\cos_\alpha$ is measured ($x_1$ and $x_2$ representing the lateral positions of the centres of gravity $G_1$ and $G_2$ in the two sections of the seat). Moreover, the difference in longitudinal positions enables the orientation of the passenger on the seat to be determined, i.e. in this case an orientation in a direction which deviates from the front direction by an angle$_\alpha$.

In the case of a matrix connection of the different active areas (FIG. 6b), in the position/orientation mode, the relative positions of the centres of gravity $G_1 \ldots G_n$ of the active weight on each active area $8_1$, $8_2$, $8_3$ are measured. The distribution of these positions $G_1 \ldots G_n$ with respect to the seat still enables the position and orientation of the passenger on the seat to be defined. This operational mode has the advantage of being able to detect abnormal situations, such as one in which a child is sitting only on his hands or possibly when an auxiliary seat presses only on feet at the side. In this case, the detector detects a pressure only for the outer active areas $8_3$, the inner active areas $8_1$ and $8_2$ giving no signal, and deployment of the airbags can be stopped.

FIG. 7 represents an embodiment of the detector in FIG. 5 enabling the integrity of the conductors to be monitored. For this purpose, all the conductors connecting the different individual sensors $8_{1,1}$, $8_{1,2}$, $8_{1,3}$, $8_{1,4}$ or $8_{2,1}$, $8_{2,2}$, $8_{2,3}$, $8_{2,4}$ or $8_{3,1}$, $8_{3,2}$, $8_{3,3}$, $8_{3,4}$ of each section 12, 14 to each other or to the linear resistor 32 are arranged in such a way as to form a loop which has external connections, for example the terminals 36 and 38. This is achieved by a subdivision of the linear resistor 32 into several discrete resistors $32_1$, $32_2$, $32_3$, $32_4$, $32_5$ which are connected to each other by conductors supplying the individual sensors.

The integrity of the conductors can be monitored by injecting a signal into one of the terminals 36 or 38 of the resistor 32 and by detecting the signal on the second terminal 38 or 36 respectively. This is preferably carried out by the control device of the vehicle protection system. When the control device does not detect the injected signal, it selects a standard operational mode of the protection system which represents a compromise solution for all weight categories.

What is claimed is:

1. Device for determining the size of a person sitting on a seat, comprising a means for determining the respective positions of the centres of gravity of the active weight in at least two different sections of the said seat and a means for evaluating the size of the said person from the said respective positions so determined.

2. Device according to claim 1, wherein the said means for determining the positions of the centres of gravity comprises a means for detecting the distance between a first centre of gravity of the weight on a first section of the seat and a second centre of gravity of the weight on a second section of the seat, the two sections of the seat being laterally adjacent.

3. Device according to claim 1, wherein said means for determining the position of the centres of gravity comprises a position-defining force detector which extends over the surface of the seat.

4. Device according to claim 3, characterised in that the said position-defining force detector comprises several strip-shaped active areas, the said active areas being located on both sides of a line of separation of the said two sections and extending parallel to the said line.

5. Device according to claim 4, wherein the different active areas of a section of the seat are supplied with different voltages.

6. Device according to claim 5, wherein each active area of the said first section of the seat and the corresponding active area of the said second section of the seat are supplied with the same voltage.

7. Device according to claim 4, wherein the active areas of a section are supplied by means of a potential gradient through several resistors connected in series, so that the circuitry of the active areas represents a linear potentiometer circuit.

8. Device according to claim 4, wherein each active area comprises several individual sensors which are placed in line in the longitudinal direction of the seat.

9. Device according to claim 8, wherein the individual sensors of each active area are supplied with different voltages.

10. Device according to claim 9, wherein the corresponding individual sensors of the different active areas of a section are supplied with the same voltage.

11. Device according to claim 9, wherein the individual sensors of a section are supplied by means of a potential gradient through a linear resistor, so that the circuitry of the individual sensors represents a linear potentiometer circuit.

12. Device according to claim 3, wherein the said force detector comprises force sensors whose electric resistance varies with the applied force.

13. Device according to claim 4, wherein said active areas are connected to connection terminals by means of conductors, wherein said device comprises a circuit for monitoring the integrity of the conductors.

14. Device according to claim 1, wherein the said means for determining the positions of the centres of gravity is incorporated in the cushion of the seat.

15. Method for determining the size of a person sitting on a seat, comprising the steps:
  subdivide the surface of the seat into at least two sections,
  determine the respective position of the centre of gravity of the active weight in each section, and
  evaluate the size of the said person from the said respective positions so determined.

16. Method according to claim 15, wherein the surface of the seat is subdivided into two laterally adjacent sections, and wherein the evaluation of the size comprises the determination of the distance between the positions of the two centres of gravity of the weight in the said two sections.

17. Method according to claim 15, comprising the additional step of evaluating the position of the said person on the said seat from the distribution of the positions of the centres of gravity on the seat.

18. Method according to claim 15, comprising the additional step of evaluating the orientation of the said person on the said seat from the longitudinal positions of the centres of gravity of the active weight in each section.

19. Method according to one of claim 17 or 18, wherein the evaluation of the different parameters is carried out sequentially.

20. Use of a device according to claim 1 in the control of an airbag of a motor vehicle.

21. Device according to claim 9, wherein the individual sensors of a section are supplied by means of a potential gradient through several resistors connected in series, so that the circuitry of the individual sensors represents a linear potentiometer circuit.

22. Device according to claim 8, wherein said individual sensors are connected to connection terminals by means of conductors, wherein said device comprises a circuit for monitoring the integrity of the conductors.

23. Device for determining the weight of a person sitting on a seat, comprising a means for determining the respective positions of the centres of gravity of the active weight in at least two different sections of the said seat and a means for evaluating the weight of the said person from the said respective positions so determined.

24. Device according to claim 23, wherein the said means for determining the positions of the centres of gravity comprises a means for detecting the distance between a first centre of gravity of the weight on a first section of the seat and a second centre of gravity of the weight on a second section of the seat, the two sections of the seat being laterally adjacent.

25. Device according to claim 23, wherein said means for determining the position of the centres of gravity comprises a position-defining force detector which extends over the surface of the seat.

26. Device according to claim 25, characterised in that the said position-defining force detector comprises several strip-shaped active areas, the said active areas being located on both sides of a line of separation of the said two sections and extending parallel to the said line.

27. Device according to claim 26, wherein the different active areas of a section of the seat are supplied with different voltages.

28. Device according to claim 27, wherein each active area of the said first section of the seat and the corresponding active area of the said second section of the seat are supplied with the same voltage.

29. Device according to claim 26, wherein the active areas of a section are supplied by means of a potential gradient through several resistors connected in series, so that the circuitry of the active areas represents a linear potentiometer circuit.

30. Device according to claim 26, wherein each active area comprises several individual sensors which are placed in line in the longitudinal direction of the seat.

31. Device according to claim 30, wherein the individual sensors of each active area are supplied with different voltages.

32. Device according to claim 31, wherein the corresponding individual sensors of the different active areas of a section are supplied with the same voltage.

33. Device according to claim 31, wherein the individual sensors of a section are supplied by means of a potential gradient through a linear resistor, so that the circuitry of the individual sensors represents a linear potentiometer circuit.

34. Device according to claim 25, wherein the said force detector comprises force sensors whose electric resistance varies with the applied force.

35. Device according to claim 26, wherein said active areas are connected to connection terminals by means of conductors, wherein said device comprises a circuit for monitoring the integrity of the conductors.

36. Device according to claim 23, wherein the said means for determining the positions of the centres of gravity is incorporated in the cushion of the seat.

37. Method for determining the weight of a person sitting on a seat, comprising the steps:
   subdivide the surface of the seat into at least two sections,
   determine the respective position of the centre of gravity of the active weight in each section, and
   evaluate the weight of the said person from the said respective positions so determined.

38. Method according to claim 37, wherein the surface of the seat is subdivided into two laterally adjacent sections, and wherein the evaluation of the weight comprises the determination of the distance between the positions of the two centres of gravity of the weight in the said two sections.

39. Method according to claim 37, comprising the additional step of evaluating the position of the said person on the said seat from the distribution of the positions of the centres of gravity on the seat.

40. Method according to claim 37, comprising the additional step of evaluating the orientation of the said person on the said seat from the longitudinal positions of the centres of gravity of the active weight in each section.

41. Method according to one of claim 39 or 40, wherein the evaluation of the different parameters is carried out sequentially.

42. Use of a device according to claim 23 in the control of an airbag of a motor vehicle.

43. Device according to claim 31, wherein the individual sensors of a section are supplied by means of a potential gradient through several resistors connected in series, so that the circuitry of the individual sensors represents a linear potentiometer circuit.

44. Device according to claim 30, wherein said individual sensors are connected to connection terminals by means of conductors, wherein said device comprises a circuit for monitoring the integrity of the conductors.

45. Device for determining the size and the weight of a person sitting on a seat, comprising a means for determining the respective positions of the centres of gravity of the active weight in at least two different sections of the said seat and a means for evaluating the size and the weight of the said person from the said respective positions so determined.

46. Method for determining the size and the weight of a person sitting on a seat, comprising the steps: subdivide the surface of the seat into at least two sections, determine the respective position of the centre of gravity of the active weight in each section, and evaluate the size and the weight of the said person from the said respective positions so determined.

47. Method according to claim 46, wherein the surface of the seat is subdivided into two laterally adjacent sections, and in that the evaluation of the size and the weight comprises the determination of the distance between the positions of the two centres of gravity of the weight in the said two sections.

48. Method according to claim 46, comprising the additional step of evaluating the position of the said person on the said seat from the distribution of the positions of the centres of gravity on the seat.

49. Method according to claim 46, comprising the additional step of evaluating the orientation of the said person on the said seat from the longitudinal positions of the centres of gravity of the active weight in each section.

* * * * *